United States Patent Office 3,613,211
Patented Oct. 19, 1971

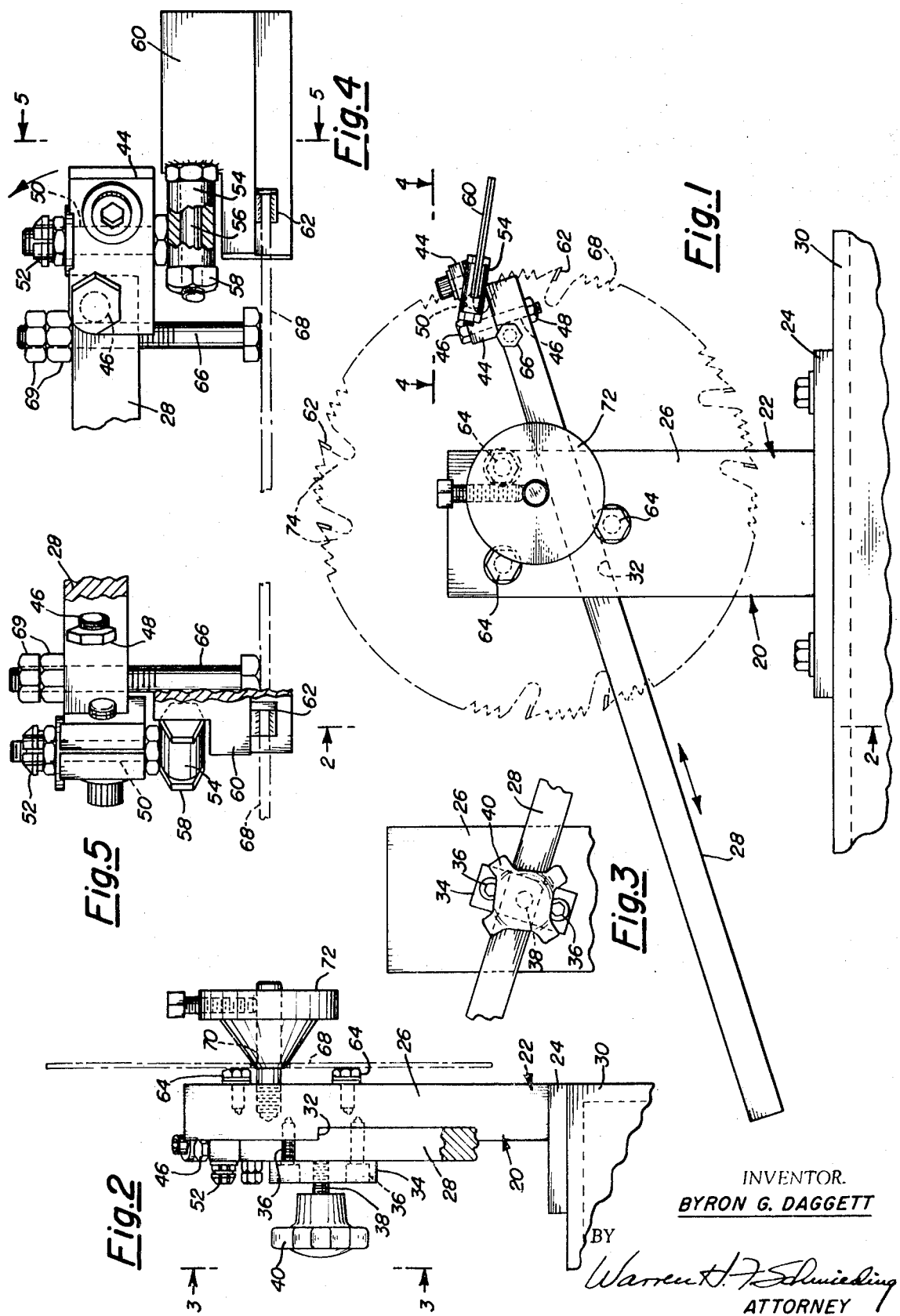

3,613,211
DEVICE FOR POSITIONING AND ADJUSTING
RELATIVELY HARD TEETH TO THE TEETH
OF A CIRCULAR SAW
Byron G. Gaggett, 3836 Centraloma Drive,
San Diego, Calif. 92108
Filed Oct. 7, 1969, Ser. No. 864,359
Int. Cl. B23p 19/00
U.S. Cl. 29—200 P                                      10 Claims

ABSTRACT OF THE DISCLOSURE

A device for positioning and adjusting relatively hard teeth to tooth holders of steel, circular saws. The device includes a frame and an assembly of elements and pivots whereby the support for the hard tooth can be swung horizontally from a position in which the hard tooth thereon is aligned with the tooth holder on the saw and swung out of such aligned position. The assembly can be adjusted to positions corresponding to the desired shape of the cutting faces of the hard teeth.

BACKGROUND OF THE INVENTION

(1) Field of the invention

The invention is directed to the art of positioning and adjusting hard teeth to the tooth holders of circular saws.

(2) Description of the prior art

To applicant's knowledge, all heretofore known devices for welding hard teeth to the tooth holders of circular saws were cumbersome, difficult to manipulate and costly to manufacture.

SUMMARY OF THE INVENTION

A device for positioning and adjusting relatively hard teeth to the tooth holders of circular saws formed of steel, the device including a frame for the free rotation of the saw. The frame carries an arm which pivotally carries a pivot support and the support with the pivot therein can be shifted from a position in which the pivot lies at right angles relative to the plane of the saw whereby the cutting faces of the hard teeth can lie parallel to other positions with the axis of the saw or at angles different than parallel.

That pivot is oscillatable in the support and is held in the position to which it is manually adjusted. That pivot carries a sleeve which, in turn, oscillatably carries a horizontally extending pivot which carries a horizontally extending hard tooth support.

The assembly of the parts, which are pivotally carried by the arm, can be swung to a position away from the saw or into position in which the tooth support is aligned with the saw. Too, the tooth support can be tilted about its pivot from a horizontal position to positions which vary from horizontal. And, the assembly can be tilted to a position in which the tooth support supports the hard tooth in a position corresponding to the desired slope of the cutting faces of the hard teeth.

Other features and the advantages of the present invention will be apparent from the following description, reference being made to the accompanying drawing wherein a preferred embodiment of the invention is illustrated.

BRIEF DESCRIPTION OF THE DRAWING

FIG. 1 is a front view of the device;

FIG. 2 is a left side view looking in the direction of arrows 2 of FIG. 1;

FIG. 3 is a fragmentary front view looking in the direction of arrows 3 of FIG. 2;

FIG. 4 is a fragmentary view looking in the direction of arrows 4 of FIG. 1, but on a larger scale; and FIG. 5 is a fragmentary view looking in the direction of arrows 5 of FIG. 4.

DESCRIPTION OF THE PREFERRED EMBODIMENT

The device 20 includes a frame 22 having a base 24, an upright 26 and an arm 28. The base is suitably secured to a bench 30. The rear side of the upright 26 is provided with a slot 32 which angles upwardly to the right as viewed in FIG. 1 for receiving the arm 28. A block 34 spans the arm and is fixed to the back of the upright by two screws 36. The arm 28 is held in adjusted position by a screw 38 which is threaded into the block 34 and bears against the arm. The screw 38 is provided with a knob 40.

An arm 44 is pivotally carried by a pivot pin 46 on the top of the arm 28 adjacent the right end of the arm. The pivot pin is in the form of a bolt. A nut 48 on the bolt frictionally holds the arm 44 against accidental turning, but the arm 44 can be turned manually and frictionally held in the position to which it is moved manually.

The arm 44 carries a horizontally extending pivot pin 50 which may be oscillated manually, but is frictionally held against accidental movement by a nut 52.

A horizontally extending arm in the form of a sleeve 54 is carried on the forward end of pivot pin 50 and this sleeve carries a pivot pin 56 in the form of a bolt. The pivot pin 56 is oscillatable in the sleeve 54 but is frictionally held against accidental movement by a nut 58. The pivot pin 56 carries a tooth support 60 in the form of a horizontally extending plate. A hardened tooth 62, preferably formed of carbide, is carried by the support 60.

Three abutments 64 in the form of heads of bolts are threaded into the front side of the upright 26. A fourth abutment 66 in the form of the head of a bolt is threaded into the arm 28. A saw 68, having a central opening 70, is mounted for rotation on the rear end of a cone-shaped saw retainer 72. The rear of the saw rides against abutments 64 and 66. The adjustment of abutment 66 is such that it flexes the saw forwardly whereby it is restrained from movement. However, the saw can be moved manually about retainer 72. Abutment 66 is held in adjusted position by nuts 69.

Circular saws differ in construction. Some saws, like the one shown in my copending application which was filed on even date with this application and which application bears Ser. No. 864,408, have teeth in which adjacent teeth extend different distances from opposite sides of the saw and the peripheral surfaces of the adjacent teeth are at different angles. In some saws the cutting faces of the teeth are at different angles than other saws.

The present invention provides a device which can be adjusted to provide for fixing the hard teeth on any of the several types of saws. The tooth support 60 can be swung about the pivot pin 46 in a counterclockwise direction from the position shown in FIG. 4, whereby the saw 68 can be advanced to adjacent the position at which a tooth holder 74 on the saw is adjacent the position shown in FIGS. 4 and 5. The tooth support 60 is then moved clockwise to the position shown in FIGS. 4 and 5. Then a tooth 62 is placed at the position shown in FIGS. 4 and 5. The tooth holder 74 on the saw is then moved onto the tooth 62 whereby the tooth can be welded to the holder 74. If desirable, after the tooth holder 74 is moved onto the tooth, the saw retainer 72 can be manipulated to hold the saw 68 in fixed position prior to and during the welding operation.

The tooth support 60 can be tilted clockwise or counterclockwise from the position shown in FIG. 5. This tilting takes place about the pivot pin 56, which as previously stated is frictionally held in the position to which it had been moved manually. When the tooth support 60 is tilted from horizontal position in one direction, the tooth 62, when welded in position, will be tilted in that same direction. Likewise, when the tooth support 60 is tilted in the opposite direction, the tooth 62, when welded in position, will be tilted in said opposite direction. Thus, it is apparent that by providing for tilting of the tooth support 60, the hard teeth 62 can be welded to the saw tooth holders 74 in a plane at right angles with respect to the side planes of the saw, or at any angle with respect to the side planes of the saw.

After a tooth 62 is welded to the saw tooth holder 74, the support 60 is swung to the right from the position shown in FIG. 5, whereby the saw can be advanced to the position in which any tooth can be welded to a saw tooth holder 74.

The device 20 is adjustable to accommodate various diameter saws since the arm 28 which carries the hard tooth support 60 is adjustable relative to the frame 22. One of the larger saws is shown in the drawing.

The hard tooth support 60 can be tilted about the axis of pivot pin 50 whereby the support 60 and the tooth 62 thereon are parallel with the desired angle of the cutting face of the tooth, one angle of cutting faces being shown in FIG. 1.

Having described my invention, I claim:

1. A device for positioning and adjusting relatively hard teeth onto the tooth holders of a steel, circular saw, said device comprising:
   (A) a frame;
   (B) means on the frame for axially supporting a circular saw;
   (C) an arm;
   (D) a pivot pin on the frame for pivotally supporting the arm;
   (E) a second arm;
   (F) a pivot pin on the first mentioned arm for supporting the second mentioned arm in a substantially horizontal position;
   (G) a support for a hard tooth;
   (H) a third pivot pin on the second mentioned arm for supporting the tooth support.

2. A device as defined in claim 1, characterized in that the frame includes:
   (A)(1) an arm for supporting the first mentioned arm, said third mentioned arm being slidable parallel with the plane of the saw; and further characterized to include:
   (I) means on the frame for securing the third mentioned arm in adjusted position.

3. A device as defined in claim 1, characterized in that the support for the hard tooth includes a substantially horizontally extending surface for supporting the hard tooth.

4. A device as defined in claim 1, characterized in that the saw is supported with the sides thereof extending vertically.

5. A device as defined in claim 1, characterized in that the saw is supported with the sides thereof extending vertically, and further characterized in that the support for the hard tooth includes a substantially horizontally extending surface for supporting the hard tooth.

6. A device as defined in claim 1, characterized in that the first mentioned arm is movable manually; and further characterized to include:
   (I) means for frictionally retaining the first mentioned arm in the position in which it is manually moved.

7. A device as defined in claim 3, characterized in that the first mentioned arm is movable manually; and further characterized to include:
   (I) means for frictionally retaining the first mentioned arm in the position in which it is manually moved.

8. A device as defined in claim 4, characterized in that the first mentioned arm is movable manually; and further characterized to include:
   (I) means for frictionally retaining the first mentioned arm in the position in which it is manually moved.

9. A device as defined in claim 5, characterized in that the first mentioned arm is movable manually; and further characterized to include:
   (I) means for frictionally retaining the first mentioned arm in the position in which it is manually moved.

10. A device as defined in claim 2, characterized in that the frame also includes:
    (A)(2) at least two stabilizing abutments adapted to be engaged by a side face of the saw;
and further characterized in that the third mentioned arm includes:
    (I)(1) a stabilizing member engaging the same side of the saw that is engaged by the first mentioned buttons.

References Cited
UNITED STATES PATENTS

| | | | |
|---|---|---|---|
| 3,452,416 | 7/1969 | Barney et al. | 29—200 J |
| 3,467,295 | 9/1969 | Watson | 228—49 |
| 3,524,239 | 8/1970 | Lewis | 29—200 |

THOMAS H. EAGER, Primary Examiner

U.S. Cl. X.R.

228—49

UNITED STATES PATENT OFFICE
CERTIFICATE OF CORRECTION

Patent No. 3,613,211            Dated October 19, 1971

Inventor(s) BYRON G. DAGGETT

It is certified that error appears in the above-identified patent and that said Letters Patent are hereby corrected as shown below:

Column 1, line 5, "Gaggett" should be --Daggett--.

Signed and sealed this 29th day of February 1972.

(SEAL)
Attest:

EDWARD M. FLETCHER, JR.          ROBERT GOTTSCHALK
Attesting Officer                 Commissioner of Patents